(12) United States Patent
Ozsahin

(10) Patent No.: US 8,865,315 B2
(45) Date of Patent: Oct. 21, 2014

(54) SELF HEALING COATING SYSTEM FOR USE WITH FUEL TANKS

(75) Inventor: Ali Ozsahin, Plymouth, MI (US)

(73) Assignee: Huntsman International LLC, The Woodlands, TX (US)

( * ) Notice: Subject to any disclaimer, the term of this patent is extended or adjusted under 35 U.S.C. 154(b) by 213 days.

(21) Appl. No.: 13/355,588

(22) Filed: Jan. 23, 2012

(65) Prior Publication Data

US 2013/0153458 A1 Jun. 20, 2013

Related U.S. Application Data

(60) Provisional application No. 61/577,714, filed on Dec. 20, 2011.

(51) Int. Cl.
*B32B 27/00* (2006.01)
*B32B 27/06* (2006.01)

(52) U.S. Cl.
USPC .......... 428/473.5; 428/423.1; 427/407.1; 220/560.02; 220/524.3

(58) Field of Classification Search
USPC .......... 428/473.5, 423.1; 427/407.1; 220/560.02, 524.3
See application file for complete search history.

(56) References Cited

U.S. PATENT DOCUMENTS

| 4,138,377 | A | | 2/1979 | Otsuki et al. |
| 4,265,793 | A | | 5/1981 | Omika et al. |
| 4,937,293 | A | | 6/1990 | Blum et al. |
| 5,587,433 | A | * | 12/1996 | Boeckeler ............ 525/333.2 |
| 5,633,341 | A | | 5/1997 | Abend |
| 5,792,816 | A | | 8/1998 | Abend |
| 5,844,047 | A | | 12/1998 | Abend |
| 6,846,491 | B1 | * | 1/2005 | Richards ................ 424/405 |
| 2004/0023050 | A1 | * | 2/2004 | Kia et al. ................ 428/480 |
| 2007/0009694 | A1 | * | 1/2007 | Monk et al. ............ 428/35.7 |

OTHER PUBLICATIONS

"Imbiber Beads® Chemical Spill/Maintenance", Imbibitive Technologies Corporation, date unknown, pp. 1-29.

\* cited by examiner

*Primary Examiner* — Michael C Miggins
(74) *Attorney, Agent, or Firm* — Robert A. Diaz

(57) ABSTRACT

The present invention is directed to a coating system deposited onto at least a portion of a substrate comprising: an inner coating layer deposited onto at least a portion of the substrate; a viscous gel coating layer deposited onto at least a portion of the inner coating layer wherein the viscous coating layer comprises: (A) the reaction product of: (i) at least one primary amine; (ii) a monofunctional surfactant; and (iii) a liquid polybutadiene; (B) optionally, a fatty acid; and (C) optionally, a secondary swelling agent; and an outer coating layer deposited onto a least a portion of the viscous coating layer; and an outer coating layer deposited onto a least a portion of the viscous coating layer.

19 Claims, No Drawings

SELF HEALING COATING SYSTEM FOR USE WITH FUEL TANKS

BACKGROUND OF THE INVENTION

1. Field of the Invention

The present invention relates generally to a self healing coating system. More specifically, the present invention relates to a self healing coating system that can be utilized in connection with fuel tanks.

2. Background Information

Fuel tanks are present in essentially every motorized vehicle that relies on a combustion engine to power the vehicle. Moreover, non-motorized fuel tanks, such as tractor trailers, rail cars, and pipe lines, can be used to transport gasoline to various locations around the world.

In a combat environment, however, these fuel tanks can be susceptible to small arms fire which can puncture the fuel tank thereby allowing the contents of the fuel tank to leak or spill from the tank. Since fuel tanks typically contain highly combustible materials, a punctured fuel tank can greatly increase the hazardous conditions of not only the combat environment but of the area immediately surrounding the fuel tank.

While there have been attempts to line fuel tanks with liners that aim to minimize the likelihood of a punctured fuel tank from releasing its contents, many of these liners have inherent shortcomings. For instance, in some situations, installation of the liner within the fuel tank is time consuming and requires a large number of installers. In other instances, the liner itself may not completely stop the leakage if the fuel tank was punctured.

SUMMARY OF THE INVENTION

The present invention is directed to a coating system deposited onto at least a portion of a substrate comprising: an inner coating layer deposited onto at least a portion of the substrate; a viscous gel coating layer deposited onto at least a portion of the inner coating layer wherein the viscous coating layer comprises: (A) the reaction product of: (i) at least one primary amine; (ii) a monofunctional surfactant; and (iii) a liquid polybutadiene; (B) optionally, a fatty acid; and (C) optionally, a secondary swelling agent; and an outer coating layer deposited onto a least a portion of the viscous coating layer; and an outer coating layer deposited onto a least a portion of the viscous coating layer.

A process for coating a substrate with a coating system comprising: depositing an inner coating composition onto at least a portion of the substrate wherein the inner coating composition comprises a polyurea or polyurethane coating composition; depositing a viscous coating composition onto at least a portion of the first coating composition, wherein the viscous coating layer comprises: (A) the reaction product of: (i) at least one primary amine; (ii) a monofunctional surfactant, and (iii) a liquid polybutadiene; (B) optionally, a fatty acid; and (C) optionally, a secondary swelling agent; and depositing an outer coating composition onto at least a portion of the viscous polyurethane coating composition wherein the outer coating composition comprises a polyurea or polyurethane coating composition that can be the same or different from the polyurea or polyurethane coating composition of the inner coating composition.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "an" outer coating layer, "an" inner coating layer, "a" viscous coating layer, "a" surfactant, "a" fatty acid, "a" liquid polybutadiene, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Coating System

As stated above, the present invention is directed to a coating system that can be applied or deposited onto a fuel tank. In certain embodiments, the coating system disclosed herein can be applied onto the outer surface of the fuel tank. It has been surprisingly found that the coating system that is described herein may address many of the inherent shortcomings of liners that are presently being used as fuel tank liners. For instance, in some embodiments, not only can the coating composition disclosed herein be sprayed applied onto a substrate, but the coating system of the present invention can also significantly reduce or eliminate the possibility of fuel leakage if the fuel tank is punctured by small arms fire.

Accordingly, the present invention is directed to a coating system that comprises an inner coating layer and an outer coating layer. The inner coating layer is typically applied onto at least a portion of the substrate, such as the outer surface of a fuel tank, while at least a portion of the outer coating layer is applied over the inner coating layer. Disposed between the inner and outer coating layers (i.e., sandwiched between the two coating layers) is a mid-layer which is comprised of a viscous gel coating layer. As used herein, "viscous gel" means that the material has a viscosity of 600 Pascal seconds (Pa s) at 25° C. as measured by an AR 2000 Rheometer (available from TA Instruments) using a parallel plate set under the conditions of 1 Hz and 5% strain.

As a projectile, such as bullet, travels through the fuel tank, it will first travel through or become lodged in the outer coating layer. If the projectile travels through the outer coating layer, then the projectile will travel through or become lodged in the viscous gel coating layer. If the projectile travels through the viscous gel coating layer, then it will either become lodged or travel through the inner coating layer. It should be noted that by the time the projectile travels through the inner coating layer, it has already lost a significant portion of its kinetic energy. Moreover, if the projectile reaches the viscous gel coating layer, the viscous coating layer can automatically fill, via mechanical flow mechanisms, the puncture hole thereby ensuring that the contents of the fuel tank does not exit from the fuel tank through the projectile's entry point. For example, in one embodiment, if the projectile punctures the outer coating layer and travels through the outer coating layer and into the viscous gel coating layer, then at least a portion of the viscous gel coating will flow into at least a portion of the puncture hole in the outer coating layer thereby sealing the puncture hole. If the projectile is able to puncture a hole in the inner coating layer, then the viscous gel coating will not only fill at least a portion of the puncture hole in the outer coating layer but also a portion of the puncture hole that was created in the inner coating layer. It should be noted, however, the despite the preceding sentence describing only a puncture hole, the viscous gel coating will fill or seal at least a portion of any hole or crack that may form in the outer and inner coating layers regardless of whether it was caused by a projectile. In certain embodiments, at least a portion of the viscous gel coating can expand if it comes into contact with certain substances and materials thereby decreasing or eliminating the likelihood that the contents of the fuel tank will exit through the projectile's entry point. As will be discussed in greater detail below, the ability of the viscous gel coating layer to swell is partly due to its chemical composition. For example, the liquid polybutadiene component of the viscous coating layer can contribute to the swelling ability of that particular coating layer since, in certain embodiments, the polybutadiene component will swell upon contact with fuel, such as gasoline.

Inner and Outer Coating Layers

Both the inner and outer coating layers of the coating system of the present invention are deposited from a coating composition that comprises a polyurethane or polyurea polymer. While the same coating composition may be utilized in both the inner and outer coating layers, in certain embodiments, different coating compositions may be used for each coating layer. For instance, in some embodiments, the inner coating layer may be a polyurea coating layer while the outer coating layer may be a polyurethane coating layer. In other embodiments, the inner coating layer may be a polyurethane coating layer while the outer coating layer may be a polyurea coating layer. In yet other embodiments, both coating layers may be polyurea coating layers. The selection of the type of coating composition used to form the inner and outer coating layers will be dependent upon the mechanical properties that user would like to achieve. Accordingly, any combination of the aforementioned polyurea and polyurethane coating layers may be used.

In certain embodiments, one or both of the outer and inner coating layers can be considered polyurethane or polyurea elastomers. That is, the overall density of each of the layers is 99% or greater. One skilled in the art will recognize that, in these embodiments, the overall density of the elastomer is not intentionally being lowered but variation can occur due to air being trapped in the elastomer composition as a result of the spray operation and methods. Therefore, it is noted that other factors, such as the distance to the spray surface as well as the type of spray equipment used, could change the amount of air entrapment and thus impact the overall density of the elastomer.

Polyurea:

The polyurea coating composition that can be utilized in the present invention typically comprises an (1) isocyanate containing compound and (ii) a compound that contains a functional group that is reactive with the isocyanate containing compound, such as an active hydrogen containing compound. An example of compound (2) would be an amine compound.

Suitable isocyanate compounds that may be used as compound (1) include, without limitation, aliphatic and aromatic (poly)isocyanates known in the art.

For example, the aliphatic isocyanates described in U.S. Pat. No. 4,748,192 may be utilized in the present invention. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate such as the tetramethyl xylene diisocyanate. Also, cyclohexane diisocyanate is considered the preferred aliphatic isocyanate. Other useful aliphatic polyisocyanates are described in U.S. Pat. No. 4,705,814 in column 2, line 52, to column 3, line 25, which portion is incorporated herein by reference. They include aliphatic diisocyanates, for example, alkylene isocyanates with 4 to 12 carbon atoms in the alkylene radical, such as 1,12-dodecane diisocyanate and 1,4-hexamethylene diisocyanate. Also useful are cycloaliphatic isocyanates, such as 1,3- and 1,4-cyclohexane diisocyanate, as well as any desired mixture of these isomers: 1-isocyanato-3,3,5-trimethyl-5-isocyanatomethyl-cyclohexane (isophorone diisocyanate or "IPDI"); 4,4',2,2'- and 2,4'-dicyclohexylmethane diisocyanate; as well as the corresponding isomer mixtures, and the like.

A wide variety of aromatic polyisocyanates can also be utilized in the present invention. Such aromatic polyisocyanates, include without limitation, p-phenylene diisocyanate, polymethylene polyphenyl-isocyanate, 2,6-toluene diisocyanate, dianisidine diisocyanate, bitolylene diisocyanate, naphthalene-1,4-diisocyanate, bis(4-isocyanato phenyl) methane, naphthalene bis(4-phenyl isocyanate) or "MDI", and 4,4' diphenylpropane diisocyanate may all be used alone or in combination as compound (1).

Other aromatic polyisocyanates that can be used include, without limitation, naphthalene-bridged polyphenyl polyisocyanates mixtures which have a functionality of from about 2 to about 4. These latter isocyanate compounds are generally produced by the phosgenation of corresponding naphthalene bridged polyphenyl polyamines, which are conventionally produced by the reaction of formaldehyde and primary aromatic amines, such as aniline, and the presence of hydrochloric acid and/or other acidic catalysts. Known processes for preparing polyamines and corresponding naphthalene-bridged polyphenyl polyisocyanates there from are described in the literature and in many patents, for example, U.S. Pat. Nos. 2,683,730; 2,950,263; 3,012,008; 3,344,162; and 3,362,979, all incorporated herein by reference.

Usually naphthalene-bridged polyphenyl polyisocyanates mixtures contain from about 20 to about 100 percent by weight naphthalene diphenyl diisocyanate isomers, with the remainder being polymethylene polyphenyl diisocyanates having higher functionalities and higher molecular weights. Typical of these are polyphenyl polyisocyanates mixtures containing from about 20 to about 100 percent by weight diphenyl diisocyanate isomers, of which from about 20 to about 95 percent by weight thereof is the 4 4'-isomers with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

It is to be understood that the term "isocyanate" also includes quasi-prepolymers of isocyanates with active hydrogen-containing materials such as those described below. For example, the active hydrogen-containing materials used to prepare a prepolymer can include, without limitation, a polyol or a high molecular weight amine-terminated polyether, also described herein as amine-terminated alkylenes, or a combination of these materials.

Suitable amine compounds that may be used as compound (2) include, without limitation, the JEFFAMINE line of amines (available from Huntsman International LLC), aspartic ester amines, monoamine, polyamines, or combinations thereof.

The aspartic esters that can be employed in the practice of this invention comprise the reaction product of a polyamine and a dialkyl maleic or fumaric acid ester. The aspartic esters can be formed by known methods. For example, the polyamine can be reacted with the dialkyl maleic or fumaric acid ester to form an aspartic ester reaction product. Such procedures are set forth in the examples herein and are described in U.S. Pat. No. 5,243,012. In the practice of the present invention, the mole ratio of amine functionality in the amine chain extender to dialkyl maleate or fumarate is greater than 1:1. Typically, the mole ratio of amine functionality to dialkyl maleate or fumarate is greater than about 1:4. In one embodiment of this invention, the mole ratio is about 1:2 (about one-half of the amine groups have been reacted with the double bond of the dialkyl maleate or fumarate).

The primary polyamines generally correspond to the formula: $X(NH_2)_n$, wherein X represents an organic group which has a valence of n and is inert towards isocyanate groups at a temperature of 100 centigrade or less. In certain embodiments, X represents a divalent hydrocarbon group obtained by removal of the amino groups from an aliphatic, arylaliphatic or cycloaliphatic polyamine, particularly a diamine. The "n" represents an integer with a value of at least about 2, in certain embodiments from about 2 to about 4, and in one embodiment 2. Representative examples of such polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers), especially diamines, as are described hereinbelow. Mixtures of polyamines can be employed in preparing the aspartic esters used in the practice of this invention.

The maleic or fumaric acid esters generally correspond to formula: $R^1OOC-CR^3=CR^4-COOR^2$ wherein $R^1$ and $R^2$ may be the same or different and represent organic groups which are inert towards isocyanate groups at a temperature of 100 centigrade or less. $R^1$ and $R^2$ may be, for example, methyl or ethyl groups. Such maleic or fumaric acid esters include, but are not limited to, those corresponding to the formula which are dimethyl, diethyl and dibutyl esters of maleic acid and fumaric acid and corresponding to maleic or fumaric acid esters substituted by methyl in the 2- and/or 3-position. Representative examples of useful maleic acid esters include dimethyl maleate, diethyl maleate, dibutyl maleate, dioctyl maleate and mixtures thereof.

Certain of the aspartic esters of this invention may be represented by the formula: $X[-NH-C(R^3)(COOR^1)-CH(R^4)(COOR^2)]_n$, wherein X, $R^{1-4}$ and n are as described above.

The amine terminated polyether, isocyanate, and chain extender compounds that can be used in accordance with the present invention are those well known in the polyurea art such as those described in U.S. Pat. Nos. 4,891,086; 5,013,813; 5,082,917; 5,162,388; 5,171,819; 5,189,075; 5,418,005; 5,466,671; and 5,317,076.

The active hydrogen containing material of compound (ii) can also be amine terminated polyethers. Preferably, the amine terminated polyethers are selected from animated diols or triols and, more preferably, include a blend of animated diols or triols or both. More preferably, the amine terminated polyethers are selected from mixtures of high molecular weight polyols, such as mixtures of difunctional and trifunctional materials. However, a single high molecular weight aminated polyurea can be used. Also, high molecular weight amine terminated alkylenes and simple alkyl amines are included within the scope of this invention, and may be used alone or in combination with the aforementioned amine terminated polyols. In addition, other amine terminated materials having different molecular weights or different chemical compositions, may be used. The term began "high molecular weight" is intended to include polyether amines having a molecular weight of at least 1,500.

Suitable amine terminated polyether include, without limitation, primary and secondary amine terminated polyethers having greater than 1,500 average molecular weight, with a functionally of from 2 to 6, such as from 2 to 3, and amine equivalent weight of from 750 to 4,000. Mixtures of amine terminated polyethers may be used. In a preferred embodiment, the amine terminated polyethers have an average molecular weight of at least 2,000. These materials may be made by various methods known in the art.

The amine terminated polyethers useful in this invention may be, for example, polyether resins made from an appropriate initiator to which lower alkylene oxides, such as ethylene oxide, propylene oxide, butylene oxide, or mixtures thereof, are added with the resulting hydroxyl terminated polyols then being aminated. When two or more oxides are used, they may be present as random mixtures or as blocks of one or the other polyether. In the amination step, it is highly desirable that the terminal hydroxyl groups in the polyols be essentially all secondary hydroxyl groups for ease of amination. If ethylene oxide is used, it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, such as described in U.S. Pat. No. 3,654,370. Normally, the amination step does not completely replace all of the hydroxyl groups. However, the great majority of hydroxyl groups are replaced by amine groups. Therefore, in one embodiment, the amine terminated polyether resins useful in this invention have greater than about 80 percent of their active hydrogens in the form of amine hydrogens.

The mix ratio for compound (1) and (2) can range from 2:1 to 1:4, such as from 1:1 to 4:1

Polyurethane:

The polyurethane coating composition that can be utilized in the present invention typically comprises an (a) isocyanate containing compound and (b) a compound that contains a functional group that is reactive with the isocyanate containing compound, such as an active hydrogen containing compound. An example of compound (b) would be a hydroxyl functional compound.

Suitable isocyanate compounds that may be used as compound (a) include, without limitation, those that are listed as compound (1) in the preceding paragraphs.

Suitable hydroxyl functional compounds that may be used as compound (b) include, without limitation, polyhydroxyl compounds having a molecular weight ranging from 62 to 299. Examples of such polydydroxyl compounds include, without limitation, ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The mix ratio for compound (a) and (b) can range from 1:1 to 4:1 based on the total volume of the compounds.

Viscous Gel Coating Layer

The viscous gel coating layer comprises (A) the reaction product of (i) at least one primary amine compound, (ii) a monofunctional surfactant compound; and (iii) a liquid polybutadiene compound; (B) optionally, a fatty acid; and (C) optionally, a swelling agent.

Suitable primary amine compounds that can be used as component (i) of the present invention include, without limitation, the primary amines described above in connection with compound (2) above. Accordingly, in some embodiments, a combination of JEFFAMINE T 5000 and JEFFAMINE D 230 (available from Huntsman International LLC) may be used as compound (i) in the viscous coating composition. In certain embodiments, the primary amines are di- or tri-functional polyamines having a number average molecular weight ranging from 148 to 5000.

Suitable compounds that could be used as compound (ii) include, without limitation, monofunctinal hydroxy compounds (manols), monofunctional amine compounds (monoamiens), or combinations thereof. In certain embodiments, these compounds are non-ionic compounds. Examples of suitable manols that may be used include SURFONIC N 31.5, 60, 95 and 150 (available from Huntsman Chemical Company), WL5000 (available from Huntsman Chemical Company), or combinations thereof. It should be appreciated that some compounds used as compound (ii), such as SURFONIC N 150, can act as a swelling agent when it comes into contact with the contents of the fuel tank. For example, SURFONIC N 150 swells when it comes into contact with fuel, such as gasoline or diesel fuel. It should also be noted that SURFONIC N 150 can react with the maleic anhydride capping moiety, if present, of component (iii) which can contribute to the gelling and swelling characteristics of the viscous gel coating layer and thereby adds to the effectiveness of the viscous gel coating layer to reduce the amount of or prevent gasoline from draining from a fuel tank that has been punctured by a small arms projectile. One advantage of using the aforementioned monofuncitonal hydroxyl compounds, as opposed to polyols having a higher number of hydroxyl functionality, is that the likelihood of having a high amount of cross-linking between the various components is significantly reduced and this contributes to the viscous nature of the viscous gel coating layer. For example, if a polyol material is used in lieu of the manol, then there is a high likelihood that the material would not be as viscous as the material that is disclosed in the present invention and would not be able to flow into the puncture holes as readily as the viscous gel coating of the present invention.

In addition to compounds (i) and (ii), the viscous gel coating layer of the present invention also includes (iii) a liquid polybutadine compound. In certain embodiments, the "liquid" polybutadine compound used in the present invention has minimal crosslinking thereby enabling the polybutadiene compound to remain in a thick viscous or liquid state as opposed to being in a highly cross linked solid rubber state. Suitable polybutadiene compounds that may be used in the present invention include polybutadienesuccinimide, polybutadienesuccinate ester, or combinations thereof. In some embodiments, at least a portion of the liquid polybutadiene compound is fully or partially capped with maleic anhydride. That is, at least a portion of the polybutadiene compounds have been reacted with maleic anhydride using techniques that are well known in the art.

In certain embodiments, the mix ratio of (i) and (ii) to (iii) and, optionally, (B) ranges from 1:1 to 1:4 based on to the total volume of the coating composition.

The viscous gel coating layer can, optionally, comprise (B) a fatty acid compound, such as vegetable oil (e.g., food grade canola oil). While, the fatty acid compound can be used in an amount ranging from 0 weight % to 70 weight %, such as 10 weight % to 20 weight %, based on the total weight of the ingredients or components used to form the viscous gel coating layer, the total amount of component (B) present in the viscous gel coating layer will depend on a variety factors such as the spray equipment used as well as the process conditions (e.g., temperature) that will be used to spray the viscous gel coating layer. It should be noted that component (B) can aid in the sprayability of the viscous gel coating layer due to its ability to reduce the viscosity of the liquid polybutadiene compound. For example, in certain embodiments, a viscous gel coating layer free of component (B) can potentially limit the process used to the viscous coating layer to high pressure and higher application temperatures. While vegetable oil is an inert viscosity modifier, in some embodiments, other compatible solvents such as aliphatic and aromatic solvents, aromatics and mineral oils, and ketones and esters can be used in the present invention in lieu of vegetable oil.

Optionally, in some embodiments, the viscous gel coating layer of the present invention further comprises (D) secondary swelling agents that can further contribute to the coating layers' ability to swell upon contact with the contents of the substrate thereby increasing the effectiveness of the coating system to prevent the leakage of the contents of the substrate. Suitable secondary swelling agents include, without limitation, IMBIBER BEADS (available from Imtech). Because component (D) is optional, in certain embodiments, the viscous coating layer is free of secondary swelling agents.

Method of Making the Coating System

Each of the various coating compositions disclosed herein can be sprayed onto a substrate using equipment that is known in the art. As used herein, the substrate can be the inner surface of a fuel tank or the outer surface of the fuel tank. Accordingly, the fuel tank itself can be made from a metal alloy such as steel, aluminum, or plastics such as polypropylene or composite tanks. Additionally, the substrate itself may be coated with another coating layer prior to application of the outer coating layer onto the substrate.

Suitable apparatuses know in the art can be used to deposit or apply the various coating compositions onto the substrate. For example, a low or high pressure mix, two component spray gun with a static mix tube attachment (available from Graco/Glass Craft) can be used to deposit the coating compositions onto the substrate. Since one skilled in the art would know how to operate such a spary gun, a detailed description of the operation of the equipment will not be necessary. However, it should be understood that particular components of the coating compositions described above (e.g., the components used to form the outer or inner coating layer) will initially be separated into two sides: an A-side and a B-side. For example, with regard to a polyurea or polyurethane coating layer, the isocyanate compound (1) would be in the A-side while the active hydrogen containing compound (2) would be in the B-side. These two components remain separated until they are simultaneously introduced into and sprayed from the spray gun. While they are located in the spray gun, the two components mix and begin to undergo polymerization thereby forming either a polyurea or polyurethane coating composition that is deposited onto the substrate. With regard to the viscous gel coating layer, in certain embodiments, the (iii) fatty acid compound and the (iv) liquid polybutadiene compound are located in the A-side while the (i) primary amine compounds and the (ii) hydroxyl containing surfactant compound are located in the B-side. When these components come into contact with one another within the spray gun, a chemical reaction occurs which leads to the formation of the viscous gel coating composition that is deposited onto the outer coating layer.

While a user can typically apply the viscous gel coating layer immediately onto the inner coating layer after the inner coating layer is applied onto the substrate, in some embodiments, the user can allow the inner coating layer to cure for a time period ranging from 3 seconds to 48 hours after application. However, the application of the outer coating layer onto the viscous gel coating layer can occur immediately after the viscous coating layer is applied onto the inner coating layer or it can also be applied days after the viscous gel coating layer has been applied onto the inner coating layer.

In some embodiments, the dry film thickness of each of the inner and outer coating layers is at least 0.31 cm (0.125 in.), such as 0.64 cm (0.25 in.) and higher. In some embodiments, the thickness of each of the inner coating layer and the inner coating layer may be the same or different. Accordingly, in certain embodiments, the inner coating layer may be either thicker or thinner then the outer coating layer. Additionally, in certain embodiments, the dry film thickness of the viscous gel coating layer, after application onto at least a portion of the inner coating layer is at least 0.31 cm (0.125 in.), such as 0.64 cm (0.25 in.) and higher. For example, in certain embodiments, the viscous coating layer has a thickness ranging from 0.95 cm (2.34 in.) to 1.27 cm (3.23 in.).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Therefore, any of the features and/or elements which are listed above may be combined with one another in any combination and still be within the breadth of this disclosure.

EXAMPLES

Example 1

As described in the next paragraph, the viscous coating gel layer that was applied onto the polyurea coating layer was formed from the following composition:

| Component | Weight (grams) |
|---|---|
| A-Side | |
| N4-9000 10 MA* | 65.0 |
| Soya Oil** | 35.0 |
| B-Side | |
| SURFONIC N 150*** | 91.5 |
| JEFFAMINE T 5000**** | 7.0 |
| JEFFAMINE D 230**** | 1.5 |

*Maleinised liquid polybutadiene available from Synthomer Limited
**Vegetable Oil Food Grade
***Surfactant available from Huntsman Corp.
****Amine available Huntsman Corp.

The exterior surface of a metal fuel tank was first coated with a polyurea spray coating composition comprising RIM-LINE 95015 and SUPRASEC 9608 (available from Huntsman Corp.) using a Graco Guardian A 6 high pressure spray apparatus at a volume ratio of 1/1 wherein the spray temperature for the A and B sides of the apparatus was 62.78° C. (145° F.). The polyurea coating composition was applied in an amount to yield a coating layer having a dry film thickness of approximately 0.635 cm (0.25 inches). After, the polyurea coating layer was cured, the viscous coating gel layer, which is described above, was applied onto the polyurea coating layer at a volume ratio of 1/1 using a commercially available static mixer, Plaspak HSS spray system, to yield a coating layer having a thickness of approximately 0.95 cm (0.375 inches). After application of the viscous coating gel layer, a second coat of the aforementioned polyurea coating layer was applied over the viscous coating gel layer in an amount sufficient to yield a coating layer having a dry film thickness of approximately 0.64 cm (0.25 inches) using the Graco high pressure spray apparatus described above. The final coating system that was formed from these layers was a three layer system that comprised the viscous coating gel layer of the present invention disposed between two polyurea coating layers.

The coated fuel tank was then filled with diesel fuel and shot multiple times with 9 mm, .22 caliber, and .45 caliber projectiles, which were shot from various firearms, in order to evaluate the self-sealing performance of the coating system. The .45 caliber projectiles left entry holes, which had a diameter of approximately 1 mm, on the surface of the outer polyurea coating layer. During this test, there was either no fuel leaking from the various entry holes or there was a small amount of fuel leaking from the various holes which later stopped in less than 60 seconds.

The entry holes of the bullets into the fuel tank itself correlated well with the caliber of the gun when compared to a fuel tank that lacked the aforementioned coating system (e.g., bare fuel tank) and that was shot with the same firearms. Moreover, when this fuel tank was shot, the contents of the fuel tank exited the fuel tank until the diesel fuel level in the tank reached the bullet entry point at which time it stopped.

Another test was run where only the first polyurea coating layer was applied onto the metal fuel tank. In this test, it was found that 9 mm projectiles left holes having a diameter of approximately 10 mm. Unlike the test described above, in this test, the contents of the fuel tank exited the fuel tank until the diesel fuel level in the tank reached the bullet entry point at which time it stopped.

Accordingly, the coating system of the present invention exhibited superior self-sealing properties when compared to a bare fuel tank or a fuel tank that was coated with a single polyurea coating layer.

What is claimed is:

1. A coating system deposited onto at least a portion of a fuel tank comprising:
an inner coating layer deposited onto at least a portion of the fuel tank;
a viscous gel coating layer deposited onto at least a portion of the inner coating layer wherein the viscous coating layer comprises: (A) the reaction product of: (i) at least one primary amine; (ii) a monofunctional surfactant; and (iii) a liquid polybutadiene; (B) optionally, a fatty acid; and (C) optionally, a secondary swelling agent; and
an outer coating layer deposited onto a least a portion of the viscous coating layer.

2. The coating system according to claim 1, wherein the polybutadiene compound comprises polybutadienesuccinimide, polybutadienesuccinate ester, or combinations thereof.

3. The coating system according to claim 1, wherein the inner coating layer is deposited from a coating composition comprising a polyurethane or polyurea coating composition.

4. The coating system according to claim 1, wherein the outer coating layer is deposited from a coating composition comprising a polyurethane or polyurea coating composition.

5. The coating system according to claim 1, wherein the outer coating layer and the inner coating layer are deposited from a polyurethane or polyurea coating composition, and wherein the outer coating layer and the inner coating layer may comprise the same or different coating compositions.

6. The coating system according to claim 1, wherein the (iii) liquid polybutadiene comprises maleic anhydride capped polybutadienes.

7. The coating system according to claim 1, wherein the mix ratio of (i) and (ii) to (iii) and, optionally, (B) ranges from 1:1 to 1:4 based on to the total volume of the coating composition.

8. The coating system according to claim 1, wherein (i) comprises at least one tri-functional primary amine and at least one di-functional primary amine; wherein (ii) comprises a non-ionic, mono-hydroxyl surfactant; and wherein (B) comprises a vegetable oil.

9. The coating system according to claim 1, wherein the inner coating layer is deposited onto an inner surface of the fuel tank.

10. The coating system according to claim 1, wherein the inner coating layer is deposited onto an outer surface of the fuel tank.

11. A process for coating a fuel tank with a coating system comprising:
depositing an inner coating composition onto at least a portion of the fuel tank wherein the inner coating composition comprises a polyurea or polyurethane coating composition;
depositing a viscous coating composition onto at least a portion of the first coating composition, wherein the viscous coating composition comprises: (A) the reaction product of: (i) at least one primary amine; (ii) a monofunctional surfactant, and (iii) a liquid polybutadiene; (B) optionally, a fatty acid; and (C) optionally, a secondary swelling agent; and
depositing an outer coating composition onto at least a portion of the viscous coating composition wherein the outer coating composition comprises a polyurea or polyurethane coating composition that can be the same or different from the polyurea or polyurethane coating composition of the inner coating composition.

12. The process according to claim 11, wherein the swelling agent comprises polybutadienesuccinimide, polybutadienesuccinate ester, or combinations thereof.

13. The process according to claim 11, wherein the (iii) liquid polybutadiene comprises maleic anhydride capped polybutadienes.

14. The process according to claim 11, wherein the mix ratio of (i) and (ii) to (iii) and, optionally, (B) ranges from 1:1 to 1:4 based on to the total volume of the coating composition.

15. The process according to claim 11, wherein (i) comprises at least one tri-functional primary amine and at least one di-functional primary amine; wherein (ii) comprises a non-ionic, mono-hydroxyl surfactant; and wherein (B) comprises a vegetable oil.

16. The process according to claim 11, wherein the inner coating composition is allowed to cure prior to deposition of the viscous coating composition.

17. The process according to claim 11, wherein the inner coating composition is deposited onto an inner surface of the fuel tank.

18. The process according to claim 11, wherein the inner coating composition is deposited onto an outer surface of the fuel tank.

19. The process according to claim 11, further comprising curing the outer coating composition.

* * * * *